(12) United States Patent
Dougherty et al.

(10) Patent No.: US 11,427,119 B2
(45) Date of Patent: Aug. 30, 2022

(54) FUEL TANK-MOUNTED BEVERAGE CONTAINER FOR A MOTORCYCLE

(71) Applicant: O'Dochartaigh, LLC, Prescott, AZ (US)

(72) Inventors: Daniel A. Dougherty, Prescott, AZ (US); Irene Dougherty, Prescott, AZ (US)

(73) Assignee: O'Dochartaigh, LLC, Prescott, AZ (US)

( * ) Notice: Subject to any disclaimer, the term of this patent is extended or adjusted under 35 U.S.C. 154(b) by 80 days.

(21) Appl. No.: 16/282,635

(22) Filed: Feb. 22, 2019

(65) Prior Publication Data

US 2019/0291621 A1    Sep. 26, 2019

Related U.S. Application Data

(60) Provisional application No. 62/647,598, filed on Mar. 23, 2018.

(51) Int. Cl.
*B62J 9/25*         (2020.01)
*B60N 3/10*         (2006.01)
(Continued)

(52) U.S. Cl.
CPC ............... *B60N 3/103* (2013.01); *B62J 9/25* (2020.02); *B65D 81/3876* (2013.01); *B65D 85/72* (2013.01); *B65D 2547/04* (2013.01)

(58) Field of Classification Search
CPC ... B62J 9/008; B62J 11/02; B62J 9/001; B62J 37/00; A45F 2003/166; A45F 3/20; Y10S 224/926
See application file for complete search history.

(56) References Cited

U.S. PATENT DOCUMENTS 4,095,812 A    6/1978   Rowe
4,274,566 A    6/1981   Rowe
(Continued)

OTHER PUBLICATIONS

Jurries, Amy; Retractable Reel Controls Your Hydration Tube; Apr. 12, 2012; The Gear Caster; http://www.thegearcaster.com/2012/04/retractable-reel-controls-your-hydration-tube.html#more (Year: 2012).*

(Continued)

*Primary Examiner* — Brian D Nash
(74) *Attorney, Agent, or Firm* — Shumaker & Sieffert P.A.

(57) ABSTRACT

An insulated tank bag that may fasten to a motorcycle fuel tank to hydrate the rider with ice cold water/fluids while operating their motorcycle. In various examples, the beverage container can be used on street bikes, off road vehicle, ATV's, dirt bikes, etc. The insulated tank bag may include, for example, a three-liter cube-shaped hydration water reservoir/bladder for containing ice and cold fluid for an extended period of time. The hydration water reservoir may be provided with a hydration hose attached to the reservoir/bladder, extending out of the bag to the exterior side of the tank bag. The hydration hose may be secured by a retractable reel to the side of the tank bag. The hydration hose may be accessible to the rider by his non-throttle hand without removing their helmet and inserting it in their mouth under or through the helmet head protection. Once a rider is hydrated they can release the hydration hose, which will retract to its fixed position on the side of the tank bag.

11 Claims, 5 Drawing Sheets

(51) Int. Cl.
*B65D 81/38* (2006.01)
*B65D 85/72* (2006.01)

(56) References Cited

U.S. PATENT DOCUMENTS

| | | | |
|---|---|---|---|
| 5,265,769 A | 11/1993 | Wilson | |
| 5,358,142 A | 10/1994 | Holmes | |
| 5,727,714 A * | 3/1998 | Fawcett | A45F 3/16 |
| | | | 222/175 |
| 6,032,831 A * | 3/2000 | Gardner | A45F 3/16 |
| | | | 220/703 |
| 6,401,997 B1 | 6/2002 | Smerdon, Jr. | |
| 6,422,439 B1 * | 7/2002 | Kelliher | A45F 3/04 |
| | | | 190/110 |
| D478,722 S * | 8/2003 | Parker | D3/215 |
| D504,306 S * | 4/2005 | Chisolm | D8/356 |
| D597,399 S * | 8/2009 | Draeger-Larkin | D8/356 |
| 7,661,620 B2 * | 2/2010 | Fields | A45F 5/004 |
| | | | 224/162 |
| 8,746,519 B2 * | 6/2014 | Young | A45F 5/021 |
| | | | 224/162 |
| 8,777,075 B2 | 7/2014 | Bretl et al. | |
| 10,421,655 B1 * | 9/2019 | Steele | A45F 3/16 |
| 2001/0020628 A1 * | 9/2001 | Campion | A45C 11/22 |
| | | | 222/103 |
| 2004/0007605 A1 * | 1/2004 | Mares | A45F 3/04 |
| | | | 224/630 |
| 2004/0040993 A1 * | 3/2004 | Spratley | B62J 9/008 |
| | | | 224/413 |
| 2005/0258203 A1 * | 11/2005 | Weaver | A45F 5/004 |
| | | | 224/162 |
| 2008/0029561 A1 * | 2/2008 | Reichert | A45F 3/20 |
| | | | 224/148.2 |
| 2009/0212081 A1 * | 8/2009 | Liang | A45F 3/04 |
| | | | 224/148.2 |
| 2011/0101050 A1 | 5/2011 | Parazynski et al. | |
| 2014/0144944 A1 * | 5/2014 | Rogers | A45F 3/16 |
| | | | 251/342 |
| 2017/0079413 A1 * | 3/2017 | Guerrero | A45F 3/20 |
| 2018/0035787 A1 * | 2/2018 | Jaeger | B67D 1/0888 |
| 2018/0093875 A1 * | 4/2018 | Steele | B67D 1/0005 |
| 2019/0200737 A1 * | 7/2019 | Heward | A45F 3/20 |

OTHER PUBLICATIONS

REI; Showers Pass VelEau 42 Hydration System—42 fl. oz.; 2014; https://www.rei.com/product/815173/showers-pass-veleau-42-hydration-system-42-fl-oz (Year: 2014).*

* cited by examiner

FUEL TANK-MOUNTED BEVERAGE CONTAINER FOR A MOTORCYCLE

CROSS-REFERENCE TO RELATED APPLICATIONS

This application claims priority to and the benefit of provisional patent application No. 62/647,598, filed in the United States Patent and Trademark Office on Mar. 23, 2018, the entire content of which is incorporated herein by reference for all applicable purposes.

INTRODUCTION

Field

The present disclosure relates generally to beverage containers, and in some examples, more particularly to beverage containers mounted atop fuel tanks on motorcycles or similar vehicles.

BACKGROUND

Staying hydrated while riding a motorcycle can be a difficult proposition, especially on long rides. While handlebar-mounted cup holders for motorcycles have been introduced to the market, such cup holders are typically unstable and result in spilled beverages. Furthermore, the limited size of the cup limits the amount of the beverage that may be carried. Backpacks that include larger beverage reservoirs and allow hydration by drinking through a hose or long straw can address some issues, but can be uncomfortable on the rider's back.

SUMMARY

In various representative aspects, the instant disclosure provides for an insulated tank bag that may fasten to a motorcycle fuel tank to hydrate the rider with ice cold water/fluids while operating their motorcycle. In various examples, the beverage container can be used on street bikes, off road vehicles, ATVs, dirt bikes, etc. The insulated tank bag may include, for example, a reservoir (e.g., a three-liter cube-shaped hydration water reservoir/bladder) for containing ice and cold fluid for an extended period of time. The hydration water reservoir may be provided with a hydration hose attached to the reservoir/bladder, extending out of the bag to the exterior side of the tank bag. The hydration hose may be secured by a retractable reel to the side of the tank bag. The hydration hose may be accessible to the rider by his non-throttle hand without removing their helmet and inserting it in their mouth under or through the helmet head protection. Once a rider is hydrated they can release the hydration hose, which will retract to its fixed position on the side of the tank bag.

These and other aspects are more fully comprehended upon review of this disclosure.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

In the following detailed description, only certain exemplary embodiments of the present invention are shown and described, by way of illustration. As those skilled in the art would recognize, the invention may be embodied in many different forms and should not be construed as being limited to the embodiments set forth herein. In the context of the present specification, when an element is referred to as being "on" another element, it can be directly on the other element or be indirectly on the other element with one or more intervening elements interposed therebetween. Also, in the context of the present specification, when an element is referred to as being "connected" or "coupled" to another element, it can be directly connected or coupled to the other element or be indirectly connected or coupled to the other element with one or more intervening elements interposed therebetween. Like reference numerals designate like elements throughout the specification.

A detailed description of an exemplary application, namely a beverage container, is provided as a specific enabling disclosure that may be generalized to any application of the disclosed system, device and method for hydration in accordance with various embodiments of the present invention.

The present disclosure provides for an insulated tank bag that may fasten to a motorcycle fuel tank to hydrate the rider with ice cold water/fluids while operating their motorcycle. In various examples, the beverage container can be used on street bikes, off road vehicle, ATV's, dirt bikes, etc. The insulated tank bag may include, for example, a reservoir (e.g., a three-liter, generally cube-shaped hydration water reservoir/bladder) for containing ice and cold fluid for an extended period of time. The hydration water reservoir may be provided with a hydration hose attached to the reservoir/bladder, extending out of the bag to the exterior side of the tank bag. The hydration hose may be secured by a retractable reel to the side of the tank bag. The hydration hose may be accessible to the rider by his non-throttle hand without removing their helmet and inserting it in their mouth under or through the helmet head protection. Once a rider is hydrated they can release the hydration hose, which can then retract to its fixed position on the side of the tank bag.

INTRODUCTION

Figure 1:
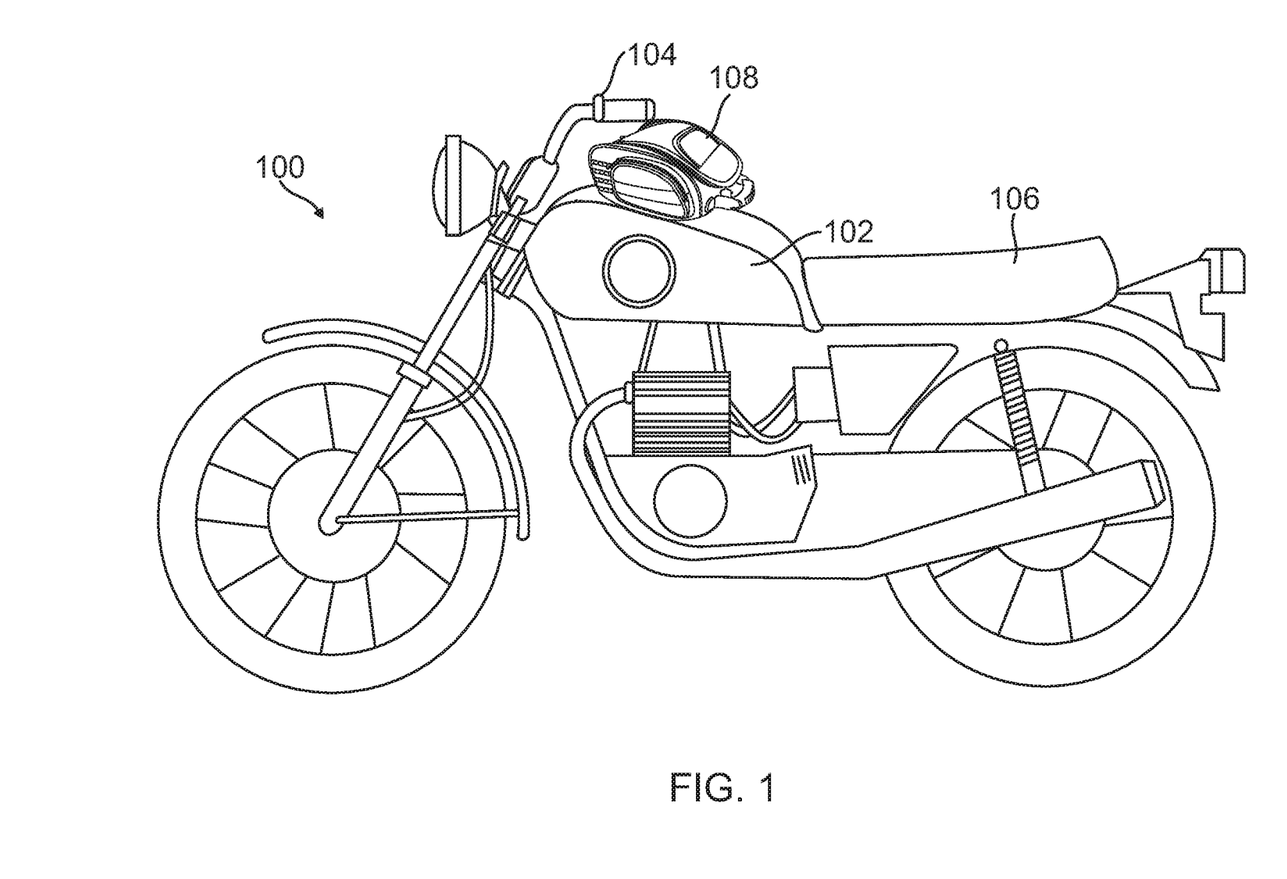
FIG. 1 is a diagram illustrating a motorcycle having a fuel-tank mounted beverage container according to some aspects of the disclosure.

Methods and apparatus for carrying or transporting a beverage may operate in conjunction with a vehicle such as a motorcycle 100. Referring now to FIG. 1, a motorcycle 100 includes a fuel tank 102 generally located between its handlebars 104 and seat 106. According to an aspect of the present disclosure, a beverage container 108 is located on a top surface of the fuel tank 102. By virtue of the beverage container 108, a rider of the motorcycle 100 can easily stay hydrated even over long distances and great lengths of time.

Figure 2:
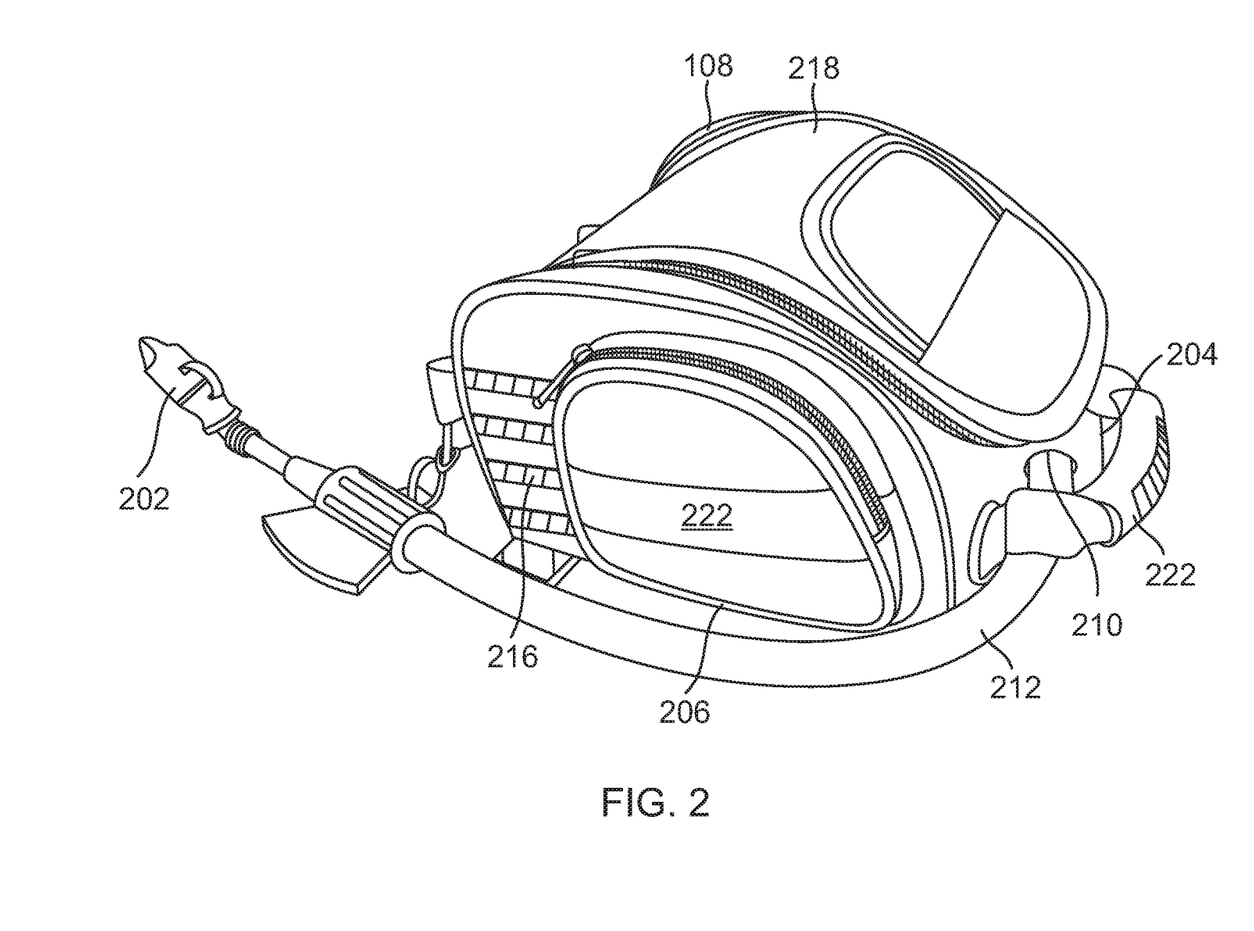
FIG. 2 is a diagram illustrating a plan view of a beverage container according to further aspects of the disclosure.

FIG. 2 shows a plan view of an exemplary beverage container 108 according to some aspects of the present disclosure. As illustrated, the beverage container 108 may be fastened to the fuel tank 102 by utilizing an included fastener 202. The illustrated fastener 202 includes a set of straps and buckles that may be adjusted or adjustable to affix the beverage container 108 to a variety of shapes and sizes of fuel tank 102. In some examples, the beverage container 108 and fastener 202 may be configured for universal mounting to any or all motorcycle tanks, or at least to a variety of motorcycle tanks. In some further examples, the fastener 202 may be configured such that the beverage container 108 is detachable from the motorcycle 100. In such an example, the beverage container 108 may further include a handle 222 and/or attachment points, anchors, or anchor points onto which a carrying strap (e.g., a shoulder strap) may be attached. The beverage container 108 may include an outer surface 204, which may be constructed of a flexible, collapsible material such as a natural, synthetic, or blended fabric. In one example, the outer surface 204 may include a ballistic nylon material, and as described further below, may include foam padding for rigidity or insulation functionality. Of course, any other suitable flexible, collapsible material may be utilized within the scope of this disclosure. Furthermore, other examples may utilize a semi-rigid or rigid material as part of, or the entirety of the outer surface 204 of a beverage container 108, including but not limited to a plastic, resin, vinyl, and/or metal shell. In some examples, the outer surface 204 may include one or more reflective surfaces to improve visibility of the rider and their vehicle at night.

The outer surface 204 may take any suitable size, shape, or form, not limited to the size or shape illustrated in FIG. 2. For example, the outer surface 204 may have a generally rectangular-solid, curved, rounded, or oval shape, and in some examples, may be configured to take a shape generally based on the shape of the fuel tank 102 onto which the beverage container 108 may be mounted. The beverage container 108 may in some examples be sized and shaped so as not to interfere with the rider's view or use of the gauges and controls of the motorcycle 100. In some examples, a bottom surface 206 of the beverage container 108 may be generally flat, or concave, and configured to be mounted stably onto a top surface of the fuel tank 102. The footprint of the bottom surface 206 may be configured to be relatively small, that is, such that it may sit on the tank comfortably between the rider's legs. In a further aspect, the bottom surface 206 of the beverage container 108 may be constructed of a non-scratch material, and in some examples, may include one or more magnets to help affix the beverage container 108 to the fuel tank 102.

Reservoir

Figure 3:
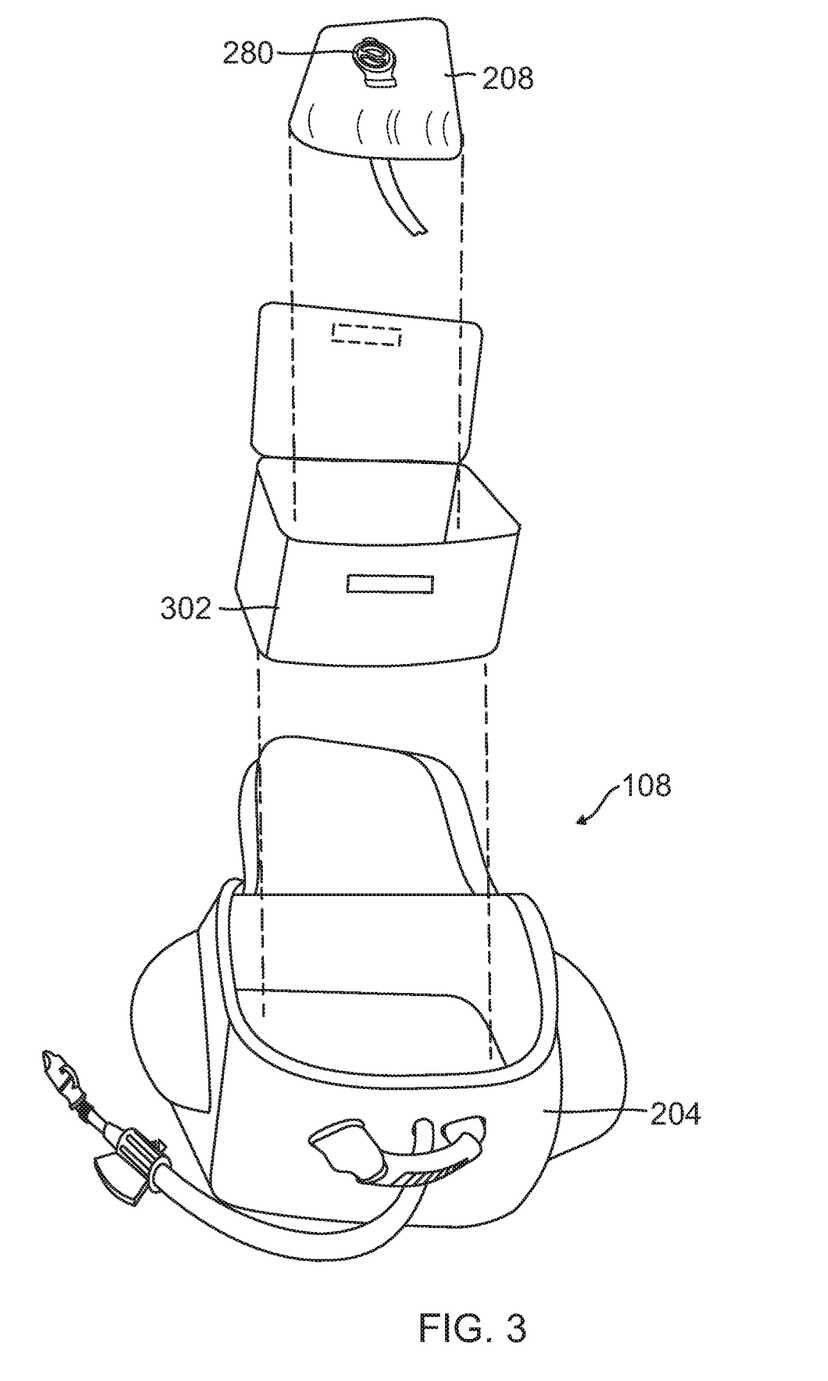
FIG. 3 is a diagram illustrating an interior of a beverage container according to further aspects of the disclosure.

Referring now to FIG. 3, the outer surface 204 of the beverage container 108 may generally surround and contain a reservoir 208 for containing a liquid within the beverage container 108. The reservoir 208 may be constructed of any suitable material, such as a food-grade plastic bag, bladder, bottle, jar, etc., including but not limited to ethylene vinyl acetate (EVA), thermoplastic polyurethane (TPU), high-density polyethylene (HDPE), polyethylene terephthalate (PET), etc. The reservoir 208 may take any suitable size and shape within the beverage container 108. As illustrated in FIG. 3, the reservoir 208 may include a fill cap 280 configured to enable filling of the reservoir 208 with a beverage.

In some examples, the reservoir 208 may substantially fill the entire space within a cavity created by the outer surface 204. In other examples, the reservoir 208 may be sized smaller than the cavity created by the outer surface 204, such that one or more other items may be placed or located within the beverage container 108 along with the reservoir 208. As described further below, some examples may include a hose cavity for storing lengths of tubing or hose, such that a length of a drinking hose 212 extending out from the beverage container 108 may be adjusted.

In some examples, the beverage container 108 may be insulated. For example, still referring to FIG. 3, the outer surface 204 of the beverage container 108 may include or be constructed out of a thermally insulative material configured to reduce a transfer of heat between the reservoir 208 and the outside environment (e.g., the fuel tank 102 and/or the atmosphere). For example, the outer surface 204 may include closed-cell foam padding for rigidity and insulation functionality. In another example, a separate thermal insulation layer 302 may be located within the beverage container 108, between the outer surface 204 and the reservoir 208. Such a separate thermal insulation layer 302 may be utilized in addition or in the alternative to the inclusion of a thermally insulating outer surface 204 material. In some examples, as illustrated in FIG. 3, such a thermal insulation liner 302 may be removable, e.g., being configured to be removed from the beverage container 108 for cleaning, or so that the beverage container 108 can be used like a standard motorcycle tank bag.

In another example, the reservoir 208 may include, and/or may be constructed out of a thermally insulating layer or material, in addition or in the alternative to the inclusion of the above. In any of these configurations, the liquid or beverage contained within the reservoir 208 may be thermally insulated (e.g., kept cool and/or hot) for an extended period of time, improving the user experience of the rider.

Hose

Referring once again to FIG. 2, the outer surface 204 of the beverage container 108 may further include an opening 210 through which a drinking hose 212 may extend. The hose 212 may be connected or coupled to the reservoir 208 to provide access to the liquid contained inside the reservoir 208. The hose 212 may be made of any suitable material, including but not limited to the food-grade plastics discussed above for the reservoir 208. The hose 212 may further take any suitable length and have any suitable thickness. All or a portion of the hose 212 may be insulated, e.g., by being constructed of a thermally insulating material and/or being covered by a suitable thermally insulating material. In some examples the length and/or thickness of the hose 212 may be configured for ease of drinking the beverage through the hose 212. The hose 212 may be fastened, coupled, or connected to the reservoir 208 in any suitable fashion, and in some examples may be removable, or capable of being disconnected from the reservoir 208. Further, the hose 212 may be flexible, enabling bending, folding, rolling, twisting, or shaping the hose 212 as needed to provide for efficient drinking, storage, and movement of the hose 212. A distal end 214 of the hose 212 may include a valve, e.g., a bite valve, configured for ease of drinking the beverage by biting or otherwise opening the valve. Such a bite valve may be configured to halt the flow of the beverage through the hose 212 when a rider is not drinking the beverage. Any suitable valve may be utilized, including but not limited to a pinch valve, a one-way valve, a twist-off cap, etc. Such a valve may be angled at any suitable angle relative to the hose 212, including but not limited to parallel to the hose 212, at a right angle from the hose 212, at a 45-degree angle to the hose 212, etc. In some examples, such a valve may be omitted.

In a further aspect of the disclosure, the opening 210 in the outer surface 204, through which the drinking hose 212 may extend, may be configured to slidably engage the hose 212 such that a rider can lengthen or shorten the length of a portion of the hose 212 that extends through the opening 210. That is, the rider may slide (e.g., push or pull) the hose 212 through the opening 210, either into or out of the beverage container 108 to configure the length of the hose 212 based on the rider's needs. For example, a length of the hose 212 extending out of the beverage container 108 may be configured, by sliding the hose through the opening 210, to take a length for comfortable hydration by drinking through the hose 212, and further, for ease of attachment of the distal end 214 of the hose 212 to the rider's selected anchor point 216. The slidable engagement between the hose 212 and the opening 210 may be configured such that, while the rider is capable of sliding the hose 212 through the opening 210, a friction fit may maintain a position of the hose 212 relative to the opening 210 at other times. For example, the opening 210 may include a pass-through grommet having one or more flanges, detents, rollers, or other engaging means for engaging the hose 212. Of course, a friction fit is not intended to be limiting in nature, and any suitable engagement between the hose 212 and the opening 210 may be utilized.

As mentioned above, the beverage container 108 may be configured not only to hold the reservoir 208 in its interior. In addition, the beverage container 108 may reserve a portion of its interior for storage of a portion of the hose 212. That is, a portion of the length of the hose 212 may be stored within the beverage container 108, enabling any suitable length of the hose 212 to be extended outward from the opening 210.

Anchor Points

As illustrated in FIG. 2, the distal end 214 of the hose 212 is connected, coupled, or fastened to one of a plurality of anchors or anchor points 216. In various embodiments, such anchor points 216 may be provided by straps, loops, hooks, D-rings, or other suitable anchor points. In other examples, anchor points 216 may be provided by magnets. The coupling mechanism for fastening the distal end 214 of the hose 212 to an anchor point 216 may be provided utilizing any suitable fastener for fastening to the anchor point 216, including but not limited to a carabiner, a hook, a clip, a button, a snap, Velcro, etc. In some examples, the coupling mechanism may be configured for ease of one-handed attachment and/or detachment to facilitate effortless placement and movement of an attachment point of the hose to a selected anchor point 216.

Although the illustrated example shows the fastener located at or very close to the distal end 214 of the hose 212, it should be noted that this is not intended to be limiting in nature. That is, in other examples, such a fastener may be located at any suitable location at, near, or distant from the distal end 214 of the hose 212.

Figure 4:
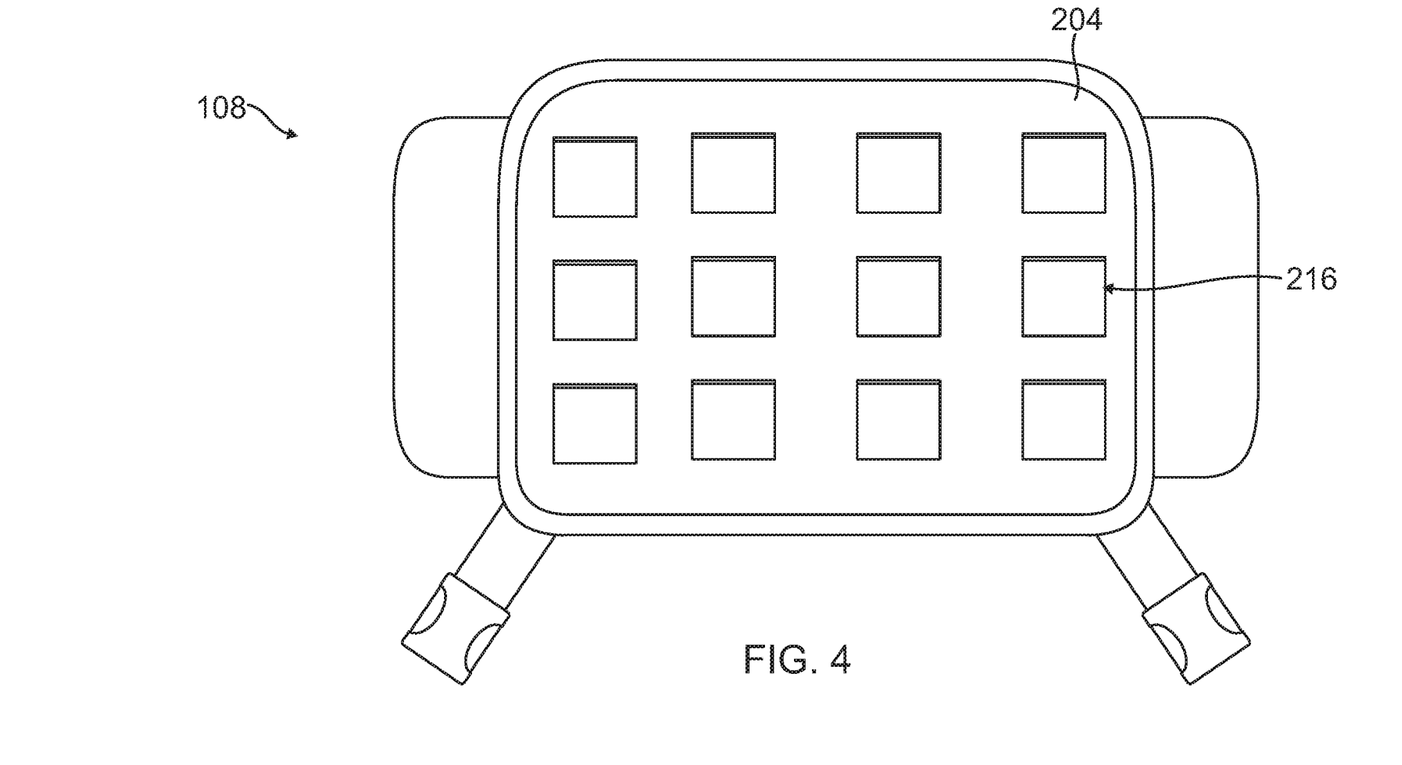
FIG. 4 is a diagram illustrating a front side of an exemplary beverage container showing a plurality of anchor points according to some aspects of the disclosure.

In FIG. 2, an area on the left-hand side of the beverage container 108 includes a set of anchor points 216. However, in various embodiments, anchor points 216 may be located at any suitable location on the outer surface 204 of the beverage container 108. Further, in some examples, multiple such anchor points 216, and/or multiple areas with multiple anchor points 216, may be located at separate locations on the outer surface 204 of the beverage container 108. For example, FIG. 4 illustrates a front-end view of an exemplary beverage container 108, showing a front surface that faces toward the handlebars 104 of a motorcycle 100 (see FIG. 1). In this illustration, the beverage container 108 includes a grid, array, or matrix of anchor points 216, which may be constructed in any suitable fashion. As one nonlimiting example, a web of anchor points 216 may be configured in the fashion of military-grade modular lightweight load-carrying equipment (MOLLE) gear, e.g., including a pouch attachment ladder system (PALS). In this example, rows of nylon straps may be sewn onto the outer surface 204 of the beverage container 108. Of course, any suitable mounting system that enables the stable carrying of accessories and/or stable attachment of a drinking hose 212 may be utilized within the scope of this disclosure, including but not limited to MOLLE, web gear, TacTec, a hook and loop storage system, etc. In another example, the outer surface 204 of the beverage container 108 may include a plurality of individually mounted, stiff textile mounting points, located at various locations on the beverage container 108. In this fashion, a rider may selectively fasten the distal end 214 of the hose 212 to any suitable anchor point 216 of their choosing, based on comfort, preference, reach, etc. For example, a left-handed rider may wish to fasten the distal end 214 of the hose 212 to the left-hand side of the beverage container 108, while a right-handed rider may wish to fasten the distal end 214 of the hose 212 to the right-hand side of the beverage container 108. Further, a tall rider may wish to fasten the distal end 214 of the hose 212 to a location higher on the beverage container 108, and/or further toward the back of the beverage container 108; while a shorter rider may wish to fasten the distal end 214 of the hose 212 to a location lower on the beverage container 108, and/or closer toward the front of the beverage container 108. In addition, such anchor points 216 are not intended to be limited only to the left-hand side or right-hand side of the beverage container 108. In other examples, such anchor points 216 may be located on a front surface, a rear surface, and/or a top surface of the beverage container 108 in addition to, or in alternative to the illustrated locations of the anchor point 216.

Referring again to FIG. 2, in some examples, the beverage container 108 may further include one or more exterior pockets or pouches 220. Such accessories may be affixed in a permanent fashion to the outer surface 204 of the beverage container 108, or in some examples, may be modular, attached to MOLLE or PALS anchors in a configuration of a user's choosing. In some embodiments, such exterior pockets or pouches 220 may include reflective material on their outer surface to improve visibility of the rider and their vehicle at night.

The beverage container 108 may further include a lid or top surface 218, which may be partially or fully removeable for access to the reservoir 208. In some examples, the lid or top surface 218 may include a map case or map pocket, which may include a visibly transparent or semi-transparent pocket into which a map may be inserted, for viewing by a rider.

Retracting Reel

Figure 5:
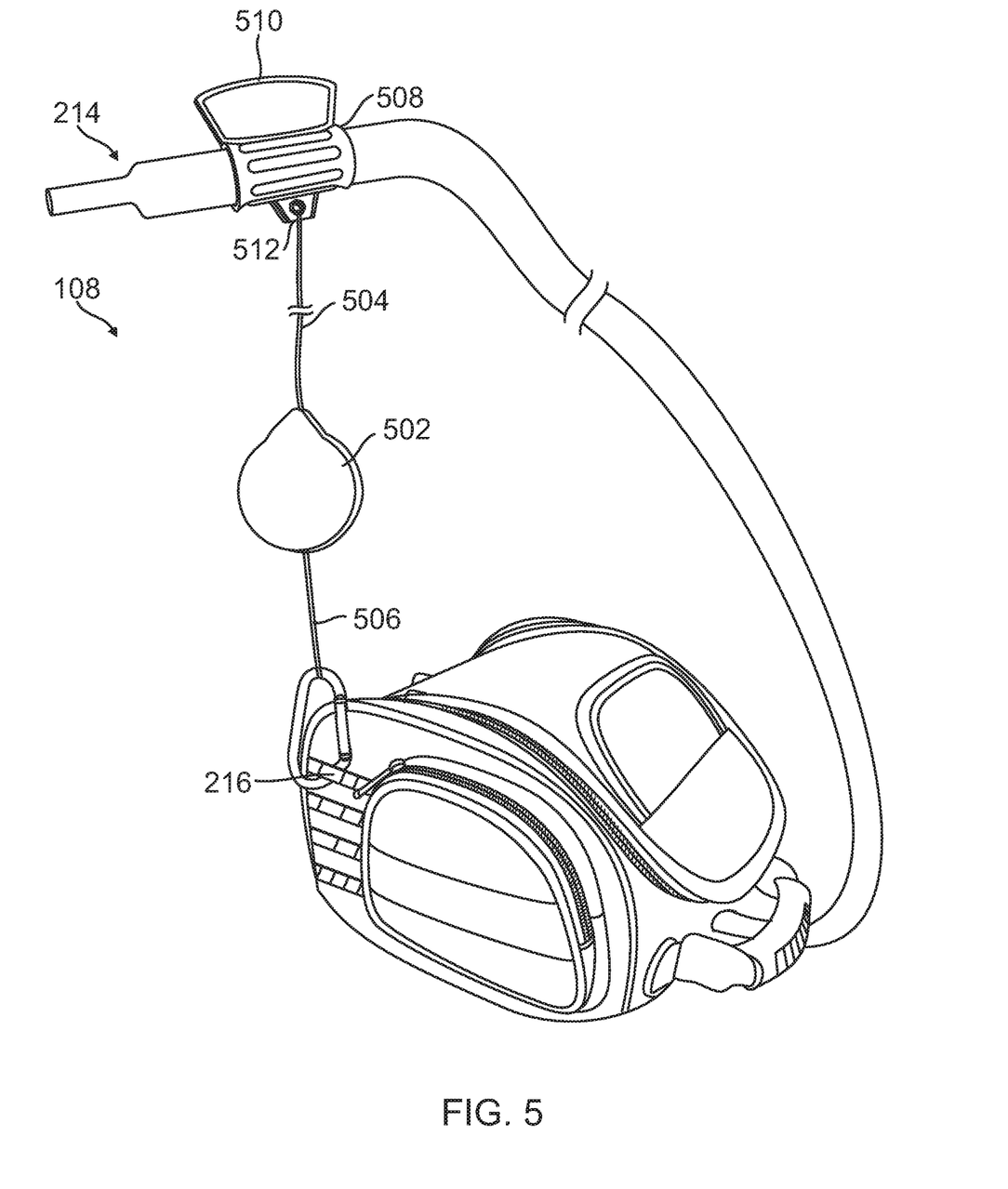
FIG. 5 is a diagram illustrating a side view of an exemplary beverage container showing detail of a retractable reel according to still further aspects of the disclosure. Elements and steps in the figures are illustrated for simplicity and clarity and have not necessarily been rendered according to any particular sequence. For example, steps that may be performed concurrently or in different order are illustrated in the figures to help to improve the understanding of various aspects of the disclosure.

In a further aspect, the coupling mechanism for coupling or fastening the distal end 214 of the hose 212 to an anchor point 216 on the beverage container 108 may include a retracting mechanism, e.g., a retractable reel. For example, FIG. 5 illustrates an exemplary retractable reel 502 including a string, rope, retraction line, or line 504 coupled between the distal end 214 of the hose 212 and the retractable reel 502. As illustrated, the line 504 may be coupled to the distal end 214 of the hose 212 utilizing a hose fastener 508. Any suitable hose fastener 508 mechanism may be utilized, including but not limited to a strap, a tie, a clamp, a clip, a loop, etc. In the illustrated example, a plastic or resin hose fastener 508 having a generally cylindrical shape enabling the hose 212 to pass through the hose fastener 508; a grasping flange 510 for enabling a rider to grasp the distal end 214 of the hose 212; and an eyelet 512 for enabling attachment of the hose fastener 508 to the line 504. Further, the retractable reel 502 is fastened to an anchor point 216 using a reel fastener 506, as described above. In some examples, the retractable reel 502 may include a spring-loaded reel, configured to enable a rider to easily grasp the hose 212 and pull the distal end 214 of the hose 212 away from the anchor point 216 to drink from the hydration hose 212, and when released, to automatically retract the distal end 214 of the hose 212 back to a location proximate to the anchor point 216 via a spring-powered retracting mechanism that reels or winds the line 504 into the retractable reel 502. Such a spring-loaded retraction mechanism is known to those of ordinary skill in the art, so the details of its functionality are not described herein. Other examples may utilize any other suitable retracting mechanism for providing a retracting function wherein the rider may pull the distal end 214 of the hose 212 to their mouth, and upon release, the distal end 214 of the hose 212 may return proximate to the anchor point 216.

In the foregoing specification, certain representative aspects of the invention have been described with reference to specific examples. Various modifications and changes may be made, however, without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described.

For example, the steps recited in any method or process claims may be executed in any order and are not limited to the specific order presented in the claims. Additionally, the components and/or elements recited in any apparatus claims may be assembled or otherwise operationally configured in a variety of permutations and are accordingly not limited to the specific configuration recited in the claims.

Furthermore, certain benefits, other advantages and solutions to problems have been described above with regard to particular embodiments; however, any benefit, advantage, solution to a problem, or any element that may cause any particular benefit, advantage, or solution to occur or to become more pronounced are not to be construed as critical, required, or essential features or components of any or all the claims.

As used herein, the terms "comprise," "comprises," "comprising," "having," "including," "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition, or apparatus. Other combinations and/or modifications of the above-described structures, arrangements, applications, proportions, elements, materials, or components used in the practice of the present invention, in addition to those not specifically recited, may be varied or otherwise particularly adapted to specific environments, manufacturing specifications, design parameters, or other operating requirements without departing from the general principles of the same.

Moreover, reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

What is claimed is:

1. A beverage container for a motorcycle having a fuel tank located between its handlebars and seat, the beverage container comprising:
   a container fastener configured for fastening the beverage container to an upper surface of the fuel tank;
   a reservoir for containing liquid within the beverage container;
   a hose coupled to the reservoir for providing access to the liquid, the hose extending through an opening in an outer surface of the beverage container;
   a plurality of anchors located at a plurality of locations on an outer surface of the beverage container; and
   a retractable reel, comprising:
      a hose fastener for fastening a retraction line of the retractable reel to a distal end of the hose; and
      a reel fastener for fastening the retractable reel to a selected anchor among the plurality of anchors,
   the retractable reel being configured for retractably engaging the distal end of the hose such that when a rider releases the distal end of the hose, a drinking valve at the distal end of the hose retracts to a position proximate the selected anchor.

2. The beverage container of claim 1, further comprising a thermal insulation layer between the reservoir and the outer surface of the beverage container for providing thermal insulation for the liquid.

3. The beverage container of claim 2, wherein the thermal insulation layer is configured to be removable from the beverage container.

4. The beverage container of claim 1, wherein the plurality of locations of the plurality of anchors comprises a left-side location providing access to the hose with a rider's left hand; and a right-side location providing access to the hose with the rider's right hand.

5. The beverage container of claim 1, wherein the opening is configured to slidably engage the hose, such that a rider can lengthen or shorten a length of a portion of the hose that extends outside the beverage container by sliding the hose through the opening.

6. The beverage container of claim 1, wherein the hose comprises the drinking valve for providing drinking access to the rider, the drinking valve located at the distal end of the hose; and wherein the retractable reel further comprises:
   the retraction line attached to the hose fastener at one end, and attached to the retractable reel at an opposite end; and
   a spring mechanism for retracting the retraction line, wherein the retraction line has a length sufficient for a rider to pull the drinking valve from a retracted position proximate to the selected anchor to the rider's mouth for drinking while riding the motorcycle.

7. The beverage container of claim 6, wherein the drinking valve comprises a bite valve configured for sealing the hose when the retractable reel is retracted, and for opening and providing drinking access to the rider when the rider bites the bite valve.

8. The beverage container of claim 1, wherein the hose fastener comprises a grasping flange configured for grasping the distal end of the hose.

9. The beverage container of claim 1, wherein the hose is configured to be removable from the reservoir.

10. The beverage container of claim 1, wherein the outer surface of the beverage container comprises a thermally insulating flexible material.

11. The beverage container of claim 1, wherein the container fastener is configured so that the beverage container is detachable from the fuel tank, the beverage container further comprising at least one of a carrying handle, a shoulder strap, one or more anchors for attaching a shoulder strap, or combinations thereof.

* * * * *